Aug. 10, 1965    J. W. GOOTHERTS    3,200,333
ELECTROMAGNETIC POSITION INDICATOR UTILIZING
PLURAL ECCENTRICALLY PIVOTED COILS
Filed June 22, 1961    5 Sheets-Sheet 1

INVENTOR:
JEROME W. GOOTHERTS
BY
ATTORNEYS

INVENTOR:
JEROME W. GOOTHERTS
ATTORNEYS

Aug. 10, 1965

J. W. GOOTHERTS 3,200,333

ELECTROMAGNETIC POSITION INDICATOR UTILIZING
PLURAL ECCENTRICALLY PIVOTED COILS

Filed June 22, 1961

INVENTOR:
JEROME W. GOOTHERTS
BY

ATTORNEYS

INVENTOR:
JEROME W. GOOTHERTS

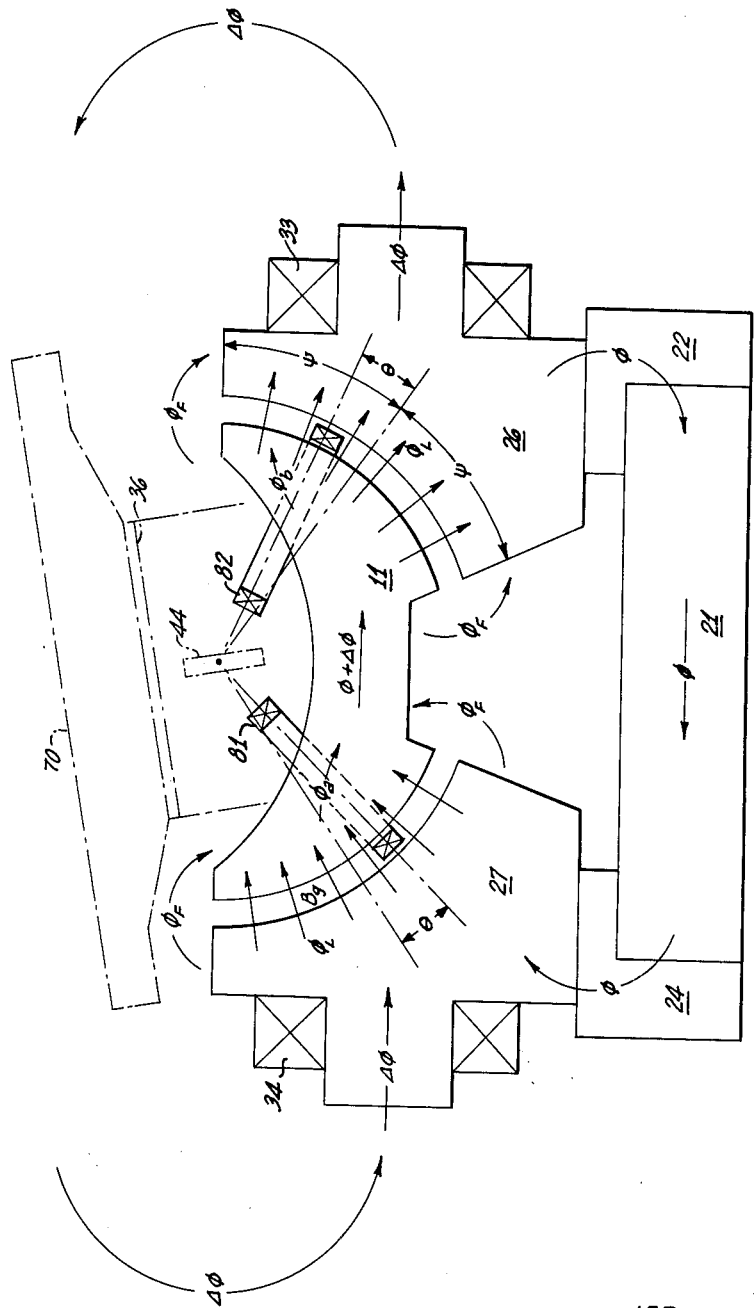

3,200,333
ELECTROMAGNETIC POSITION INDICATOR UTILIZING PLURAL ECCENTRICALLY PIVOTED COILS
Jerome W. Gootherts, Redwood City, Calif., assignor to American Radiator & Standard Sanitary Corporation, New York, N.Y., a corporation of Delaware
Filed June 22, 1961, Ser. No. 118,868
2 Claims. (Cl. 324—150)

This invention relates to and in general has for its object the provision of an electromagnetic position detector.

More specifically, one of the objects of this invention is the provision of a position detector including a frame; an indicator supporting rotor mounted on said frame through a pair of opposed spring flexure pivot assemblies for limited rotation on a fixed axis; a crescent-shaped armature fixed to said frame below said rotor and symmetrically disposed relative thereto; a first armature winding fixed to said rotor normal to said axis and circumscribing said armature core with positive clearance; a magnet mounted on said frame for generating a uniform magnetic flux having a path normal to said axis, including said armature core and cutting said armature winding; pole pieces mounted on said frame in the path of said flux and defining with said armature core an annular air gap through which said first armature winding can pass in response to the rotation of said rotor; pole piece windings mounted on said pole pieces which, when energized, will modulate said flux; and means for connecting said armature windings to a source of uniform or varying current for additionally modulating said flux.

A further object of this invention is the provision of a detector of the character above described wherein said first armature winding can be connected to a drive input current for energizing said armature winding and also to a device for sensing the voltage output or feedback signals at the armature winding terminals.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in other forms.

Referring to the drawings:

FIG. 9 is a flux diagram of my detector.

*Base and armature subassembly*

Figure 5:
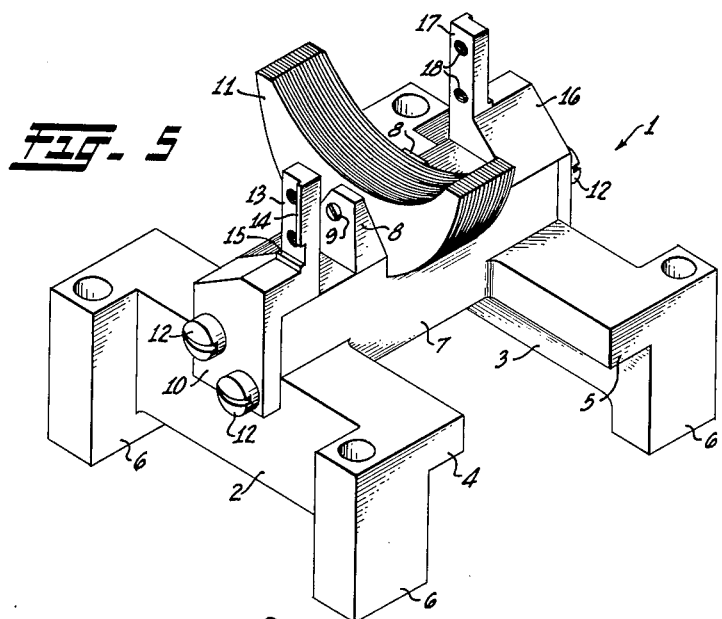
FIG. 5 is a perspective view of the base and armature subassembly of the detector illustrated in the above figures with the base magnet omitted.

As more particularly shown in FIG. 5, the base and armature subassembly includes an H-shaped aluminum base generally referred to by the reference numeral 1 and which includes legs 2 and 3, provided with overhanging flanges 4 and 5 and feet 6 and with a crossbar 7 provided with a pair of upstanding, symmetrically disposed, upwardly extending and upwardly tapered lugs 8.

Seated on the crossbar 7 within the confines of the lugs 8 and secured thereto by set screws 9 is a laminated, crescent-shaped armature core 11. Preferably, the core 11 is acid-etched for the purpose of removing burs.

Fixed to the left end of the crossbar (as viewed in FIG. 5) by screws 12 is an aluminum angle bracket 10 provided on its right-hand side with an upstanding post 13. Formed on the right-hand side of the post 13 is an outwardly extending shoulder 14 and formed at the base of the post 13 is a shoulder 15. Similarly mounted on the right-hand end of the crossbar 7 is an aluminum angle bracket 16 formed with an upstanding post 17 and otherwise identical to the angle bracket 10. Here it should be noted that the two posts 13 and 17 are diagonally opposed to each other and that each post is provided with threaded screw holes 18.

*Pole piece and magnet retainer subassembly*

Figure 6:
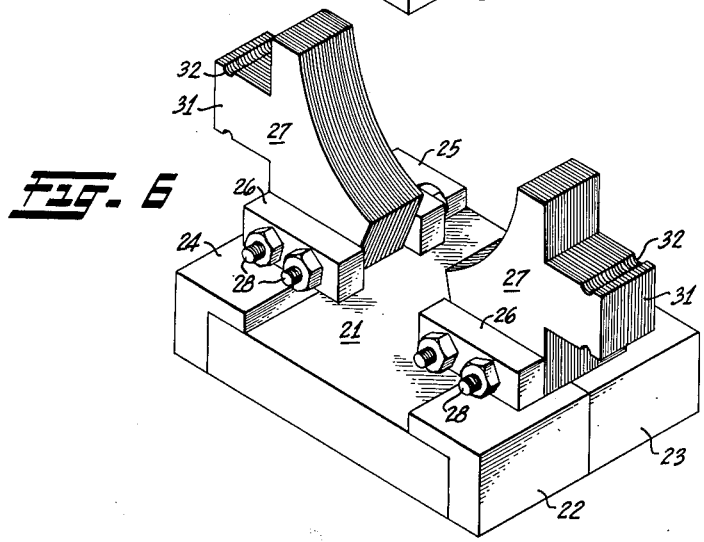
FIG. 6 is a perspective view of the permanent magnet and field coil pole piece subassembly.

Nested within the confines of the legs 2 and 3 of the base 1 and secured thereto is a pole piece and magnet retainer subassembly best shown in FIG. 6. Here it should be observed that FIGS. 5 and 6 may be considered as an exploded view of the base and armature subassembly, and pole piece and magnet retainer subassembly.

The latter subassembly includes a permanent magnet 21 secured at its north and south ends to two opposed pairs of angle clamps 22 and 23, and 24 and 25. Each of these clamps is formed on its upper side with a clamping jaw 26 partially overhanging the magnet 21. Nested between each pair of opposed jaws 26 is a laminated pole piece 27, bolts 28 extending through the jaws 26 and through the pole piece 27 being used to form an integral unitary structure of these components. The opposed faces of the pole pieces 27 are of arcuate configuration and together form a centrally interrupted concave semicylindrical surface for the reception of the crossbar 7 and the armature 11. From FIG. 4 it will be noted that a substantial annular gap 29 exists between the armature 11 and the pole pieces 27.

Formed on the outer faces of each of the pole pieces 27 is a generally rectangular field coil mount 31, each provided with a ring retaining groove or recess 32.

Mounted on the mounts 31 are A.C. field coils 33 and 34 (FIGS. 1, 3 and 4) held in place by an "O" ring or split ring 35.

*Rotary support assembly*

Figure 7:
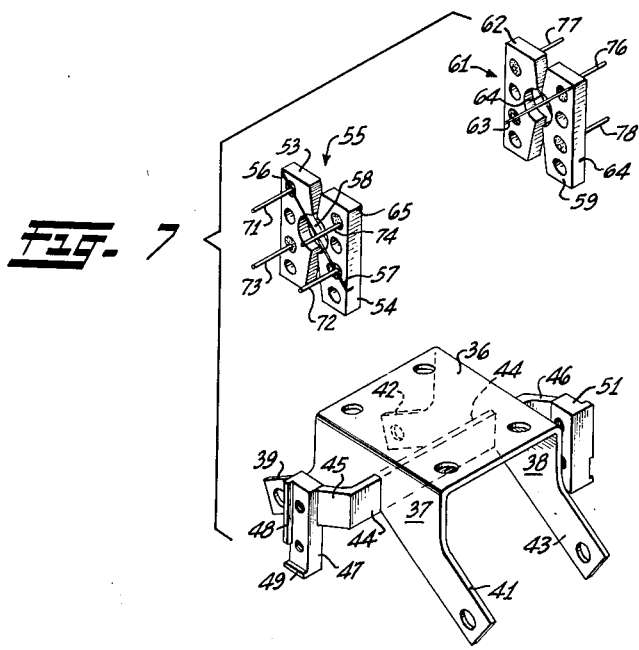
FIG. 7 is an exploded perspective view of the rotor support subassembly.

As best shown in the exploded view of FIG. 7, the rotor support assembly includes a rectangular table or platform 36 formed with opposed side skirts 37 and 38, preferably made of aluminum. Formed integral with the side skirt 37 are opposed, diverging legs 39 and 41, and similarly diverging from the side skirt 38 are legs 42 and 43. Extending through the skirts 37 and 38 and formed integral therewith is a suspension bar 44 provided with oppositely offset ends 45 and 46.

*Flexure pivot subassembly*

Secured or formed integral with the offset end 45 is a bracket 47 formed with a vertical shoulder 48 and with a lower horizontal shoulder 49. Similarly provided on the end of the opposed offset end 46 is a bracket 51 identical to the bracket 47 but diagonally opposed thereto.

Secured to the outer face of the bracket 47 by screws 52 and snugly within the confines of the shoulders 48 is an insulating plate 53 conveniently made of laminated glass, fiber and plastic. Disposed adjacent the plate 53 is an identical, opposing but reversely facing plate 54. For purposes of ready reference, the two plates 53 and 54 and their interconnecting springs (to be presently described) will be referred to as a flexure pivot subassembly and generally referred to by the reference numeral 55.

The outer faces of the plates 53 and 54 are provided with aligned diagonal slots 56 and 57 and secured in these slots is a thin beryllium-copper leaf spring 58. For this purpose an epoxyresin can be used.

Screwed to the bracket 51 is the plate 59 of a flexure pivot subassembly generally referred to by the reference numeral 61, similar to the flexure pivot assembly 55 and including an opposed plate 62. The forward faces of the plates 59 and 62 are interconnected by a diagonally disposed thin leaf spring 63 contained in a plane at right angles to the plane in which the spring 58 of the subassembly 55 is contained. The rear faces of the plates 59 and 62 are interconnected by a thin leaf spring 64, this spring and the spring 58 being coplanar but running at right angles to its companion spring 63. Connecting the back sides of the plates 53 and 54 is a diagonally disposed leaf spring 65 crossing its companion spring 58 (FIG. 1) and coplanar with the leaf spring 63 of the subassembly 61.

As a result of this construction it will be seen that the diagonally opposed plates 53 and 59 are secured rigidly to the ends of the suspension bar 44 and that the other diagonally opposed pair of plates 54 and 62 are rigidly secured to the diagonally opposed posts 13 and 17 and hence to the base subassembly 1. The only connection between the table or platform 36 and the base subassembly 1 is then by way of the two pairs of crossed leaf springs 58 and 65, and 61 and 63. Each crossed pair of leaf springs supports the platform or table 36 cantileverwise and consequently any movement of the table is constrained to rotary movement about an axis determined by the two points of intersection of the two pairs of crossed leaf springs. This action is well known and generally referred to as a restrained flexure pivot.

Figure 1:
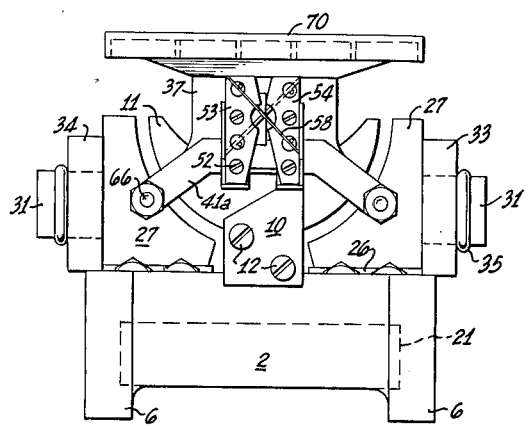
FIG. 1 is a side elevation of a position detector embodying the objects of my invention.
Figure 2:
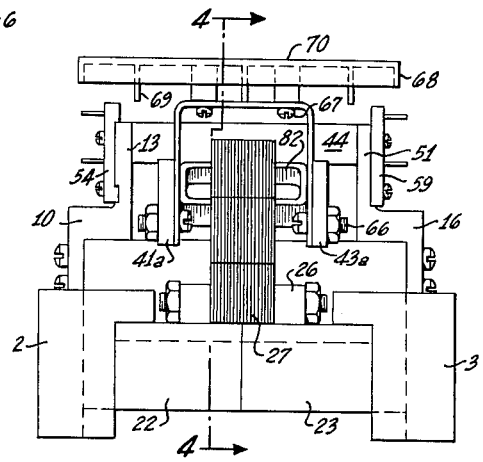
FIG. 2 is a right end elevation of the detector illustrated in FIG. 1, with the field coils removed.
Figure 3:
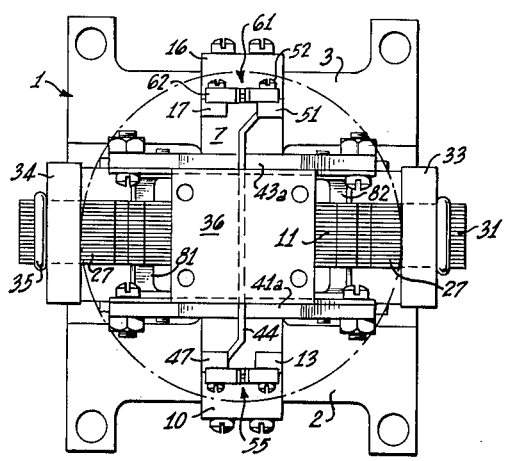
FIG. 3 is a plan of the detector shown in FIGS. 1 and 2 with mirror removed.

As shown in FIGS. 1, 2 and 3 (but not shown in FIG. 7), nonmagnetic counterweights 41a and 43a are secured to the outer faces of the table legs 41 and 43 by bolts 66. These counterweights parallel the legs 41 and 43 and extend across the intervening skirts 37.

Fastened to the table or platform 36 by screws 67 is a circular aluminum mirror support 68 provided on its under side with reinforcing ribs 69. Preferably a mirror surface 70 is formed directly on the upper face of the support, and here it should be noted that the mirror is simply one form of an indicator operating in response to the rotation of the rotor, table or platform 36.

Welded to each end of leaf spring 58 are outwardly extending terminal pins 71 and 72 and similarly connected with the ends of crossing leaf spring 65 are terminal pins 73 and 74. In like manner the leaf spring 63 of the subassembly 61 is provided with terminal pins 75 and 76 and the leaf spring 64 with terminal pins 77 and 78 (see FIG. 8). Here it should be noted that, although the leaf springs of each pair of springs are crossed, they have no electrical contact with each other. Also, it should here be noted that the adjacent edges of the plates 53 and 54 and the adjacent edges of the plates 62 and 59 are divergent and spaced from each other so as to accommodate the suspension bar 44 and permit it to rotate through a limited angle without coming into contact with the straddling plates 53 and 54 and 59 and 62.

*Drive coils*

Circumscribing the left-hand end of the armature core 11 (FIGS. 2, 4 and 8) with positive clearance is a drive coil 81, and likewise circumscribing the other end of the armature core 11 is a drive coil 82. Conveniently, these coils can be made of rectangular configuration to snugly fit between each opposed pair of table legs 41 and 43 and can be bonded thereto by any suitable adhesive. The coils 81 and 82 can therefore move with rotor assembly relative to the stationary armature 11.

*Circuitry*

Figure 8:
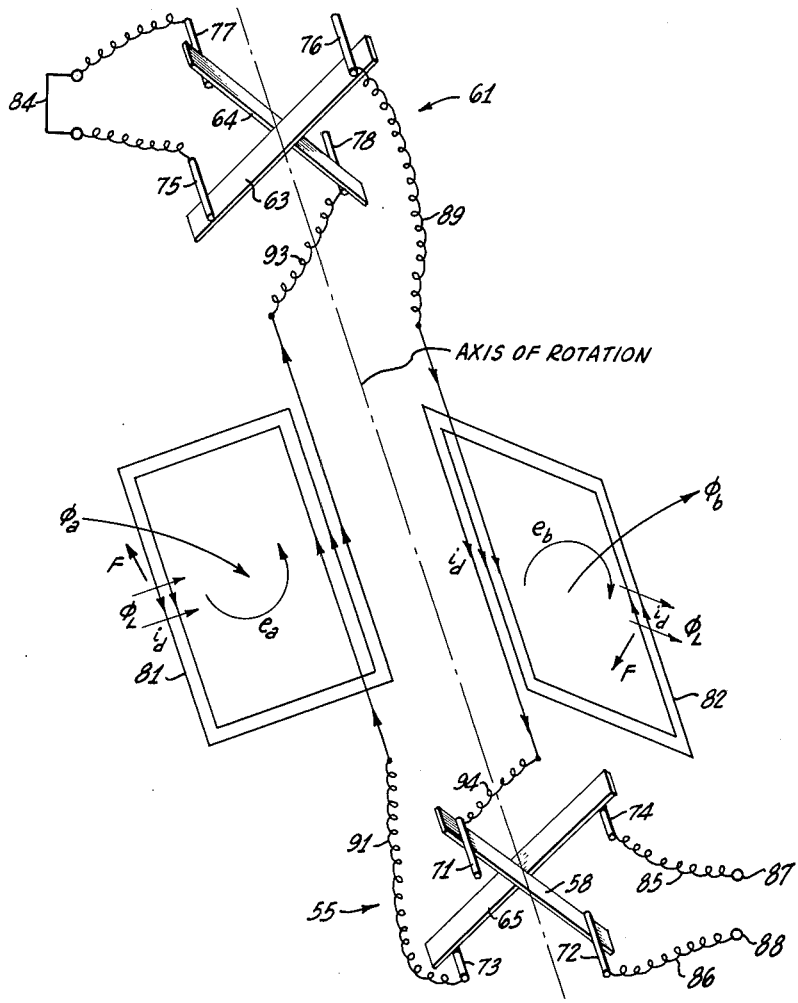
FIG. 8 is a schematic diagram of the detector drive coils, and flexure pivot circuitry.

As shown in FIG. 8, an external jumper 84 is connected across the terminal pins 75 and 77 and the terminal pins 72 and 74 are connected through leads 85 and 86 to terminals 87 and 88 by which the drive coil circuit can be connected to either a drive current input and/or to a position voltage output. One end of the coil 82 is connected through a lead 89 with the terminal pin 76 and its other end is connected through a lead 91 with the terminal 73. Similarly, the coil 81 is connected at one end through a lead 93 with the terminal pin 78 and at its other end through a lead 94 with the terminal pin 71. As a result, of this, it will be seen that the coils 81 and 82 are connected in series through the assembly 61 and are connected through the assembly 55 with the terminals 87 and 88.

Although not shown, it is here assumed that the field coils 33 and 34 are connected to a source of alternating current, say for example, of 2000 cycles per second.

*Definitions of symbols and equations*

Figure 4:
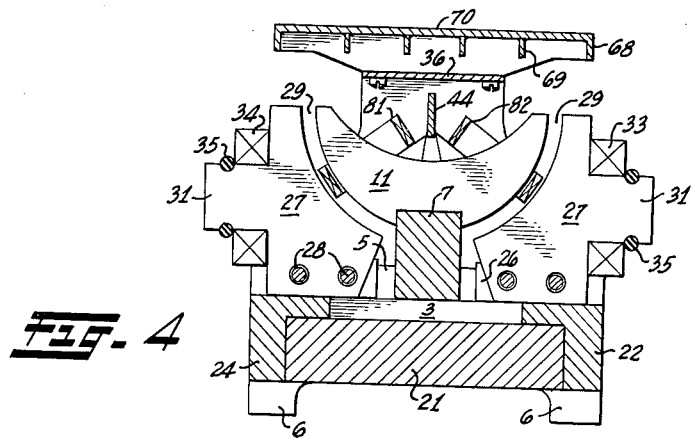
FIG. 4 is a vertical midsection taken on the section line 4—4 of FIG. 2.

Now referring to FIGS. 4 and 9 and to the symbols therein used. Here it should be noted that the angular positions of drive coils 81 and 82 indicate that rotor assembly has been rotated through an angle $\theta$ relative to its neutral position. The angle $\psi$ is the maximum amount of the angle $\theta$ that the drive coils 81 and 82 can be rotated in gap 29 from their neutral positions.

*Definitions of symbols*

$\phi$=total D.C. flux supplied by the permanent magnet 21.
$\Delta\phi$=total A.C. flux generated by the field coils 33 and 34.
$\phi_L$=portion of $\phi+\Delta\phi$ linearly distributed in the gap 29.
$\phi_F$=portion of $\phi+\Delta\phi$ fringing around the gap 29
$B_g$=gap flux density=$\phi_L 2\psi r w$ where $r$=radius of the gap and $w$=width of gap $$\phi_a = \text{flux linking drive coil } 81 = \phi_L \frac{\psi \pm \theta}{2\psi} + \phi_F$$

$$\phi_b = \text{flux linking drive coil } 81 = \phi_L \frac{\psi \mp \theta}{2\psi} + \phi_F$$

$i_d$=driving current
$F$=force generated on conductors in gap
$E_a$=electromotive force generated in coil 81.
$E_b$=electromotive force generated in coil 82.

*Torque*

$F$ (force on each coil=$B_g l n i_d$ where $l$=effective length of conductor in the gap 29, and $n$=number of conductors.

$T$ (total torque on rotor)=$2F_r = \phi_L n i_d / \psi w$.

*Position signal*

In general, $$e \frac{d}{dt}(n\phi)$$

$$e_a = \pm \frac{n\theta}{2\psi} \frac{d}{dt}(\Delta\phi)$$

$$e_b = \mp \frac{n\theta}{2\psi} \frac{d}{dt}(\Delta\phi)$$

$$e = e_a - e_b = \pm \frac{n\theta}{\psi} \frac{d}{dt}(\Delta\phi)$$

(total instantaneous E.M.F.)

If $\Delta\phi = \phi_m \sin wt$

Then $$E = .707 n \frac{\theta}{\psi} w \phi_m$$

or $$E = K\theta$$

(R.M.S. signal output) where K is a constant.

By way of summary, it will be seen that the position detector above described consists of a rotor which is attached to a base by two restrained flexure pivots which allow the rotor a limited rotary motion about a fixed axis of rotation. The rotor consists of a frame on which are fastened a driving coil (here shown as two coils) and an indicating device such as a mirror. Current for the coils is conducted to the rotor through the pivots which are electrically insulated from both base and rotor.

The rotor driving coils are free to move in the air gaps of a magentic structure attached to the base. Flux is provided by a permanent magnet (an electromagnet could be used). The air gaps are designed to give very uniform flux in the operating range of the coils by having large area in relation to length.

Auxiliary coils are provided on the magnetic structure to allow superposition of a small A.C. flux on the main D.C. field flux. This A.C. flux provides the position-sensing feature in the detector.

To operate the detector a current is allowed to flow in the driving coils. Each coil experiences a force exerted on it in a direction mutually perpendicular to the direction of flux and current. The force on each side of the coil is in opposite direction, thus creating a couple which tends to rotate the rotor. Rotation is opposed by the flexure pivots. Since the electromagnetic force is constant in a uniform field and the spring rate of the pivots is constant, the rotor will assume an angular position proportional to the current in the driving coil. Moreover, the rotor will follow variations in the driving current if the frequency of the driving current is lower than the mechanical resonant frequency of the rotor.

An A.C. current is made to flow in the auxiliary coils, causing an A.C. flux to be superimposed on the D.C. field flux. If the frequency of the A.C. current is sufficiently higher than the mechanical resonant frequency, no motion will be induced in the rotor. However, this A.C. flux will link with the driving coil. When the developed plane of the driving coil is parallel to the flux nothing will happen, but if the plane is tipped a voltage will be induced in the driving coil proportional to the angle. This generated voltage will appear at the driving coil input terminals, but being of much higher frequency than the driving current it can be separated and amplified.

Thus, utilizing this position feedback voltage to form a closed-loop servo-mechanism, the angular position of the rotor may be made to follow the amplitude of the driving current wave form with very small error up to and even above the mechanical resonant frequency.

Obviously an electromagnet can be used to replace the permanent magnet 21. If an electromagnet is used, a constant current can be maintained in the rotor drive coils and the current in the field coils varied to attain rotor position, or if desired the currents in both sets of coils can be varied. Also, the detector can be operated without the use of the auxiliary A.C. coils 33 and 34 for producing position feedback signals.

I claim:

1. A position detector comprising: an H-shaped non-magnetic frame having depending parallel legs and an upstanding crosspiece; a magnet member disposed between the legs of said frame and secured thereto; a pair of upstanding spaced, opposed, co-planar pole pieces supported by said frame over the north and south poles of said magnet, said pole pieces being on opposite sides of said crosspiece; the upper surfaces of said pole pieces being of arcuate configuration; an armature core mounted on and transversely to said crosspiece between said pole pieces in coplanar and spaced relation to said pole pieces, the adjacent surfaces of said pole pieces and said armature defining and annular air gap therebetween; first and second non-magnetic brackets mounted on said crosspiece on opposite sides of said armature core; a non-magnetic platform disposed between said brackets and above said armature core, said platform having depending legs embracing but spaced from said armature core; first and second pairs of opposed flexure pivot assemblies mounting said platform to said first and second brackets respectively for rotation of said platform about the axis of said annular air gap; first and second armature coils mounted on the legs of said platform and circumscribing said armature core with positive clearance, said first armature coil having a portion thereof disposed in said annular air gap adjacent one of said pole pieces and said second armature coil having a portion thereof disposed in said annular air gap adjacent the other of said pole pieces, said first and second armature coils being connected in series, said platform being rotable about said axis in response to energization of said armature coils; first and second pole piece coils mounted one each on each of said pole pieces with the axis of said pole piece coils being disposed in the plane of said pole pieces and armature core, said pole piece coils being electrically connected in series.

2. A position indicator comprising: a frame; a magnet mounted in said frame for generating a uniform closed-loop magnetic flux; a pair of opposed, coplanar pole pieces mounted on the north and south poles of said magnet; a crescent-shaped armature core supported by said frame between said pole pieces and having the ends thereof in spaced relation to said pole pieces, the adjacent surfaces of said pole pieces and ends of said armature core defining an annular air gap; a supporting member mounted on said frame by opposed pairs of flexure pivot asesmblies for rotation about the axis of said annular air gap; first and second generally rectangular windings having opposed legs spaced apart a distance less than the radius of said annular air gap, said windings being carried by supporting member and circumscribed around said armature core with positive clearance, said first winding having one of said opposed legs thereof disposed in said annular air gap between one end of said armature core and one of said pole pieces, and said second winding having one of said opposed legs thereof disposed in said annular air gap between the other end of said armature core and the other of said pole pieces; a planar mirror carried by said supporting member with the plane of said mirror being parallel to said axis; said windings both being on one side of said mirror being on the opposite side of a plane containing said axis.

References Cited by the Examiner

UNITED STATES PATENTS

| | | | |
|---|---|---|---|
| 2,486,641 | 11/49 | Gilbert | 324—120 |
| 2,502,369 | 3/50 | Castner | 324—151 |
| 2,907,953 | 10/59 | Piety | 324—151 |
| 2,910,631 | 10/59 | Ammon | 324—150 |

WALTER L. CARLSON, *Primary Examiner.*

BENNETT G. MILLER, MAYNARD R. WILBUR, *Examiners.*